Feb. 24, 1925.
L. M. WILLEY
1,527,721
METHOD AND APPARATUS FOR INDICATING VARIATIONS IN THE
PROPORTIONS OF A GAS MIXTURE
Filed Oct. 13, 1920
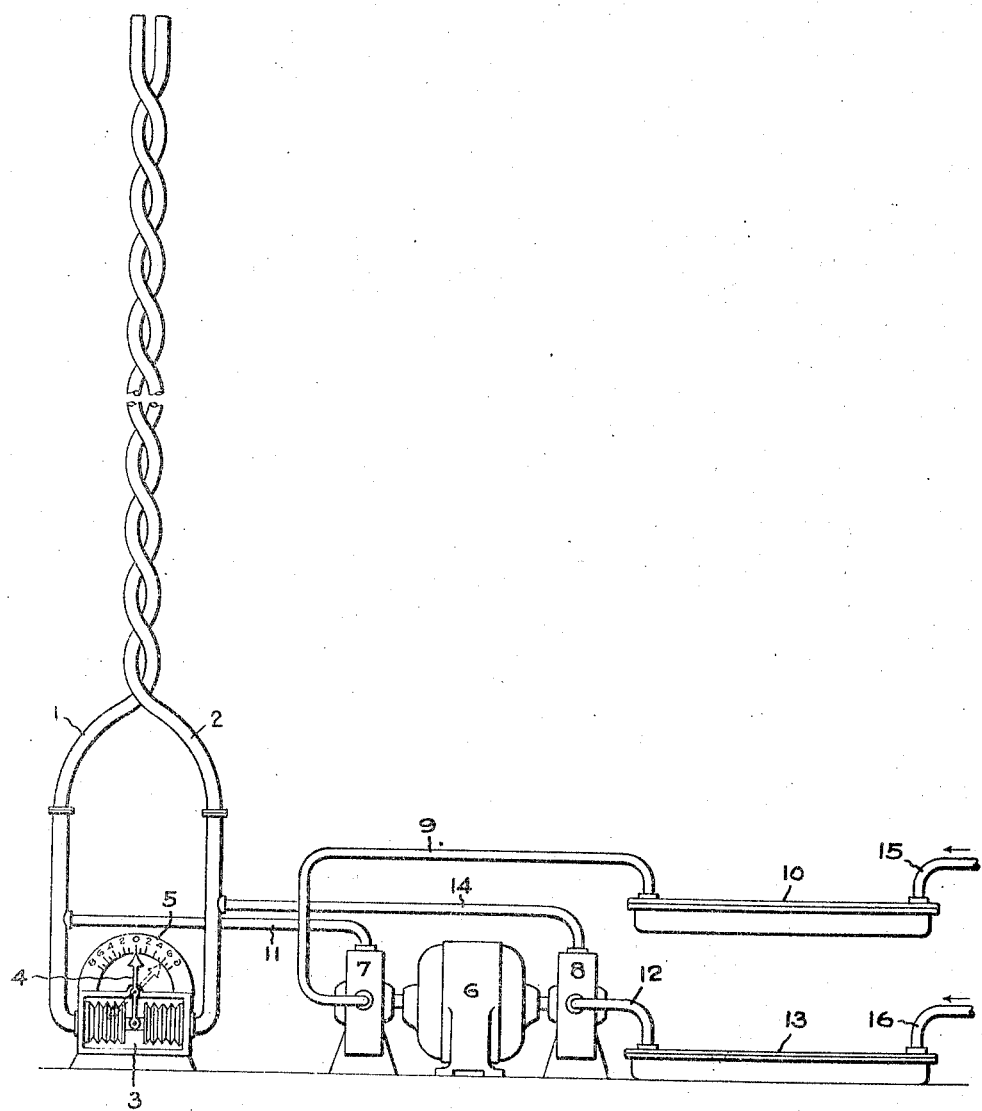
Inventor:
Leland M. Willey.
by
His Attorney.

Patented Feb. 24, 1925.

1,527,721

UNITED STATES PATENT OFFICE.

LELAND M. WILLEY, OF SCHENECTADY, NEW YORK, ASSIGNOR TO GENERAL ELECTRIC COMPANY, A CORPORATION OF NEW YORK.

METHOD AND APPARATUS FOR INDICATING VARIATIONS IN THE PROPORTIONS OF A GAS MIXTURE.

Application filed October 13, 1920. Serial No. 416,735.

*To all whom it may concern:*

Be it known that I, LELAND M. WILLEY, a citizen of the United States, residing at Schenectady, in the county of Schenectady, State of New York, have invented certain new and useful Improvements in Methods and Apparatus for Indicating Variations in the Proportions of a Gas Mixture, of which the following is a specification.

The present invention relates to the determining of variations in the proportions of a gas mixture and has for its object to provide an improved method and apparatus for this purpose.

One application of my invention is in connection with boilers for analyzing flue gas to determine or indicate variations in the percentage of $CO_2$ therein and in the following specification I have particularly described such application. It will be understood, however, that my invention is not necessarily limited thereto, but may be used wherever found applicable.

As is well known in connection with firing boilers when the burning of the fuel in the furnace is complete, the flue gas comprises principally $CO_2$, $N_2$ and $O_2$, there being little $O_2$ if the correct amount of air is being supplied. On the other hand, when there is incomplete combustion, CO gas will be formed and there will be less $CO_2$ gas present. In case, however, too much air is being supplied to the furnace, then the amount of free oxygen increases and the percentage of $CO_2$ decreases. The percentage of $CO_2$ present in the flue gas is indicative therefore of how completely and efficiently combustion is being carried out in the furnace, a decrease in the percentage of $CO_2$ indicating either incomplete combustion or an excess of air.

My invention is based on the fact that flue gas is about 1.06 to 1.09 as heavy as air varying according to the percentage of the constituent gases and to the fact that the molecular weight of $CO_2$ is substantially greater than that of either, $O_2$, $N_2$ or CO.

In analyzing flue gases according to my invention, I pass flue gass and air up through two long pipes under identical conditions of temperature and humidity, and since flue gas is heavier than air, the barometric pressure will be slightly greater in the flue gas pipe than in the air pipe. With the percentage of $CO_2$ in the flue gas which indicates efficient combustion, i. e. complete combustion but no excess of $O_2$, the barometric pressure of the flue gas will be a certain amount greater than that of the air and with any variations from this percentage of $CO_2$ gas, the difference in barometric pressure will decrease. By measuring the difference in pressure between the two pipes therefore, I can determine variations in the percentage of $CO_2$ in the flue gas.

In the drawing, the figure is a diagrammatic view of an apparatus embodying my invention and by means of which my method may be carried out.

Referring to the drawing, 1 and 2 indicate two vertical pipes. They may be, for example, fifty feet or more high, being made preferably as high as possible. They are open at their tops and at their bottoms are connected to a suitable design of differential pressure gauge 3 provided with a pointer 4 which moves over a scale 5. At 6 is a suitable motor driving two synchronous gas pumps 7 and 8. Pump 7 has its suction side connected by a pipe 9 to an air washer and humidifier 10, and its discharge side connected by pipe 11 to pipe 1. Pump 8 has its suction side connected by a pipe 12 to a gas washer and humidifier 13 and its discharge side connected by a pipe 14 to gas pipe 2. Air and flue gas are supplied to washers and humidifiers 10 and 13 respectively by pipes 15 and 16.

In operation, pipe 15 is open to atmosphere and pipe 16 is connected to the furnace at a suitable point for extracting a sample of the flue gas for analysis. Motor 6 operates pumps 7 and 8 in synchronism, and these deliver air and gas respectively to pipes 1 and 2 under exactly the same conditions as to pressure. As a result, there is a steady flow of air and gas up the two pipes.

The air is subjected to exactly the same treatment as the flue gas so that when fed up pipes 1 and 2 both will be under the same conditions as regards temperature and humidity. If found desirable I may entwine pipes 1 and 2 as shown in the drawing to assist in maintaining similar temperature conditions in both pipes.

As will be clear, if air were supplied to both pipes 1 and 2, then the barometric pressure on each side of the differential pressure gauge 3 would be the same and the indicating needle would point to zero on the scale. If, however, flue gas is supplied to pipe 2 then its greater barometric pressure will cause a deflection of the indicating needle toward the right, as indicated in dotted lines. With a certain percentage of $CO_2$ in the flue gas, the percentage desired for most efficient combustion, for example, the flue gas will have a barometric pressure a certain amount greater than that of the air and the indicating pointer will stand in a certain position. When inefficient combustion is taking place such as would occur, for example, by the supplying of either too much or too little air to the furnace, then the percentage of $CO_2$ in the flue gas will decrease with the result that the barometric pressure in the flue gas pipe 2 will decrease and the pointer of the differential pressure gauge move toward the left. This will indicate to the operator that combustion is being inefficiently carried on, and he will thereupon correct the firing of the boiler to bring the pointer back to the position indicating the correct percentage of $CO_2$. The scale 5 may be calibrated in either percent efficiency of boiler or per cent $CO_2$ and could be either indicating or recording as found desirable.
As is obvious, the principle embodied in my invention can be carried out in connection with any gaseous mixture for indicating variations in their respective proportions in any case where the molecular weight of one of the gases of the mixture differs [35] from that of the other, and while I have more particularly described my invention as being utilized as a $CO_2$ indicator for flue gases, it is to be understood that it is not necessarily limited thereto. [40]

What I claim as new and desire to secure by Letters Patent of the United States, is:—

1. The method of determining variations in the amount of $CO_2$ in flue gas which comprises passing flue gas and air up two long [45] vertical pipes under the same conditions as to temperature and humidity to establish vertical columns in the pipes, and observing the relative pressures at the bases of the vertical columns. [50]

2. In an apparatus for indicating variations in the proportions of a gas mixture such as variations in the amount of $CO_2$ in flue gas, the combination of a differential pressure gauge, two vertical pipes connected [55] thereto, and synchronized pumps for passing gases up said pipes.

3. In an apparatus for indicating variations in the proportions of a gas mixture such as variations in the amount of $CO_2$ in [60] flue gas, the combination of a differential pressure gauge, two entwined vertically extending pipes connected thereto, and means for effecting a flow of gases up said pipes.

In witness whereof, I have hereunto set [65] my hand this 11th day of October, 1920.

LELAND M. WILLEY.